US011778016B2

(12) United States Patent
Schnieders

(10) Patent No.: US 11,778,016 B2
(45) Date of Patent: Oct. 3, 2023

(54) METHOD FOR OPERATING A DISTRIBUTED APPLICATION

(71) Applicant: Deutsche Telekom AG, Bonn (DE)

(72) Inventor: Dominik Schnieders, Aachen (DE)

(73) Assignee: DEUTSCHE TELEKOM AG, Bonn (DE)

( * ) Notice: Subject to any disclaimer, the term of this patent is extended or adjusted under 35 U.S.C. 154(b) by 4 days.

(21) Appl. No.: 17/839,527

(22) Filed: Jun. 14, 2022

(65) Prior Publication Data

US 2022/0407910 A1 Dec. 22, 2022

(30) Foreign Application Priority Data

Jun. 17, 2021 (EP) ..................................... 21180178

(51) Int. Cl.
| | | |
|---|---|---|
| *G06F 11/36* | (2006.01) | |
| *G06F 8/65* | (2018.01) | |
| *G06F 15/16* | (2006.01) | |
| *H04L 67/10* | (2022.01) | |
| *H04L 67/61* | (2022.01) | |
| *H04L 61/4511* | (2022.01) | |

(52) U.S. Cl.
CPC .......... *H04L 67/10* (2013.01); *H04L 61/4511* (2022.05); *H04L 67/61* (2022.05)

(58) Field of Classification Search
USPC ........................................................ 709/219
See application file for complete search history.

(56) References Cited

U.S. PATENT DOCUMENTS

| | | | | |
|---|---|---|---|---|
| 7,917,751 | B2* | 3/2011 | Keohane | G06F 16/10 713/153 |
| 11,163,669 | B1* | 11/2021 | Torun | G06F 8/65 |
| 2004/0194102 | A1* | 9/2004 | Neerdaels | H04L 61/5007 718/100 |
| 2008/0215736 | A1* | 9/2008 | Astrom | H04L 65/1101 709/226 |
| 2011/0142015 | A1 | 6/2011 | Shaikh et al. | |
| 2013/0235795 | A1* | 9/2013 | Huang | H04W 28/18 370/328 |
| 2014/0036666 | A1 | 2/2014 | Seiji et al. | |
| 2014/0080478 | A1* | 3/2014 | Costelloe | H04W 24/04 379/32.01 |
| 2014/0244708 | A1* | 8/2014 | Taine | G06F 21/629 709/201 |

(Continued)

*Primary Examiner* — Jude Jean Gilles
(74) *Attorney, Agent, or Firm* — LEYDIG, VOIT & MAYER, LTD.

(57) ABSTRACT

A terminal device transmits, upon a launch of an application frontend of a distributed application, a lookup request based on a predetermined fully qualified domain name associated with an application backend of the distributed application to a domain name server via a communication network. Upon receipt of the fully qualified domain name, the domain name server transmits an IP address associated with the fully qualified domain name to the application frontend. Upon receipt of the IP address, the terminal device transmits application data to the transmitted IP address via a connection provided by the communication network. Upon transmission of the application data, the core server selects a quality service for the distributed application, which is then applied by the communication network for operation of the distributed application.

11 Claims, 1 Drawing Sheet

(56) References Cited

U.S. PATENT DOCUMENTS

| | | | | |
|---|---|---|---|---|
| 2014/0244762 A1* | 8/2014 | Wyndowe | ............... | G06Q 50/01 |
| | | | | 709/205 |
| 2014/0379801 A1* | 12/2014 | Gupta | ................ | H04N 21/4126 |
| | | | | 709/204 |
| 2017/0220451 A1* | 8/2017 | Mankovskii | ........ | G06F 11/3648 |
| 2018/0084084 A1* | 3/2018 | Sharma | ............... | H04L 12/1407 |
| 2019/0190981 A1* | 6/2019 | Mani | ................... | G06F 11/3636 |

* cited by examiner

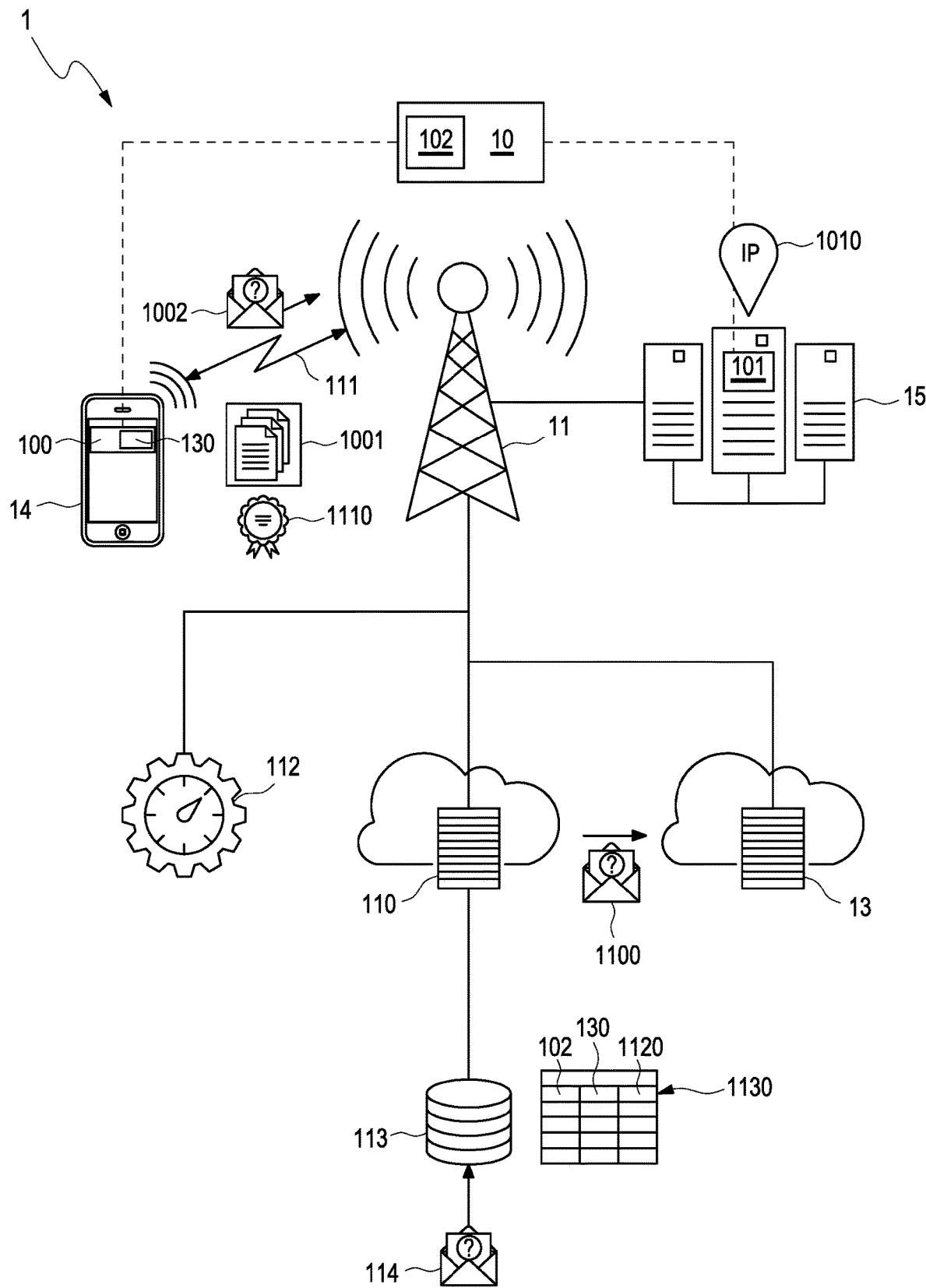

METHOD FOR OPERATING A DISTRIBUTED APPLICATION

CROSS-REFERENCE TO PRIOR APPLICATIONS

This application claims benefit to European Patent Application No. EP 21 180 178.2, filed on Jun. 17, 2021, which is hereby incorporated by reference herein.

FIELD

The invention relates to a method for operating a distributed application, wherein an application frontend of a distributed application transmits application data to an IP address of an application backend of the distributed application via a connection provided by a communication network, the communication network applies a service quality to the communication connection, and the distributed application is operated with the applied service quality. Furthermore, the invention relates to a core server for a communication network, a distributed application and a system for operating a distributed application.

BACKGROUND

A distributed application generally comprises an application backend to be executed by a backend server which, therefore, may also be referred to as an application server and at least one application frontend to be usually executed by a terminal device being arranged remote from the backend server wherein the application backend and the application frontend are configured to communicate with each other via a communication network while being executed. The terminal device may also be referred to as an application client.

ADAS (Advanced Driver Assistance System), AR (Augmented Reality)-applications and VR (Virtual Reality)-applications configured for rendering remotely and streaming, respectively, Computer Vision Algorithms for industrial robots, vehicles or drones are important examples of modern distributed applications.

Such a modern distributed application requires the application backend and the application frontend thereof to be executed in a synchronicity as high as possible for working properly. However, the synchronicity may be and generally is adversely affected by a so-called jitter which is essentially caused by a communication connection provided by the communication network and connects the application backend and the application frontend with each other, i.e. a communication delay statistically varying over time.

As a consequence, the modern distributed application requires a maximum latency of the communication network to be sufficiently low and/or a minimum bitrate of the communication network to be sufficiently high. The lower the maximum latency and/or the minimum bitrate of the communication connection is, the lower the possible jitter thereof will be and the more synchronously the distributed application will be executed. The maximum latency and/or the minimum bitrate usually corresponds to a service quality, e.g. quality of service (QoS), provided by a quality service of the communication network, i.e. a service of the communication network assigning a respective service quality to each communication connection and providing the communication connection therewith.

In a practically relevant constellation, a large plurality of different terminal devices at the same time executes a large plurality of application frontends of a large plurality of different distributed applications some of which require a very high synchronicity and some of which do not.

Accordingly, the communication network at any instant has to identify each distributed application requiring a very high synchronicity for applying an adequate, i.e. a sufficient, service quality to the communication connection used thereby, as precisely as possible.

However, methods based on an APN (access point name), an application ID, or an address of the distributed application, e.g. a triple comprising an IP address of the application backend, a port number for communication, and an application protocol used by the distributed application, have been proven to either require a very high effort for implementation, not to provide a sufficient security, not to be compatible with an encryption of the communication connection, or to suffer from port numbers varying during operation of the distributed application, to name only few practical problems.

Apart from that, none of the above-mentioned methods provides sufficient precision for telling apart distributed applications requiring a very high synchronicity from distributed applications without that requirement, i.e. uniquely identifying such distributed applications, and also a sufficient scalability of the communication network with respect to the distributed applications requiring a very high synchronicity.

SUMMARY

In an exemplary embodiment, the present invention provides a method for operating a distributed application. The method includes: transmitting, by an application frontend of the distributed application, upon a launch of the application frontend, a lookup request based on a predetermined fully qualified domain name associated with an application backend of the distributed application to a domain name server via a communication network; transmitting, by the domain name server, upon receipt of the fully qualified domain name, an IP address associated with the fully qualified domain name to the application frontend; transmitting, by the application frontend, upon receipt of the IP address, application data to the transmitted IP address via a connection provided by the communication network; selecting, by a core server of the communication network, upon transmission of the application data, a quality service for the distributed application; applying, by the communication network, a service quality determined by the selected quality service to the connection; and operating the distributed application with the applied service quality.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 1 schematically shows an entity diagram of a system according to the invention for operating a distributed application.

DETAILED DESCRIPTION

Exemplary embodiments of the invention provide a method for operating a distributed application which provides a scalable, universal, secure and reliable support for operating a distributed application requiring a very high synchronicity. Further exemplary embodiments of the invention provide a core server for a communication network, a distributed application and a system for operating a distributed application, respectively.

A first aspect of the invention is a method for operating a distributed application, wherein an application frontend of a distributed application transmits application data to an IP address of an application backend of the distributed application via a connection provided by a communication network, the communication network applies a service quality to the communication connection, and the distributed application is operated with the applied service quality. Systems comprising a communication network and distributed applications using the communication network for a communication between respective application backends and application frontends are very common. The application backend may be installed on a backend server, i.e. an application server, while the application frontend may be installed on a terminal device, i.e. an application client. Thus, the invention may be applied to many systems.

According to the invention, the application frontend of the distributed application, upon a launch of the application frontend, transmits a lookup request based on a predetermined fully qualified domain name (FQDN) associated with an application backend of the distributed application to a domain name server (DNS) via the communication network and the domain name server, upon receipt of the fully qualified domain name, transmits an IP address associated with the fully qualified domain name to the application frontend, the application frontend, upon receipt of the IP address, transmits application data to the transmitted IP address via a connection provided by the communication network, a core server of the communication network, upon transmission of the application data, selects a quality service for the distributed application, the communication network applies a service quality determined by the selected quality service to the communication connection and the distributed application is operated with the applied service quality. In other words, the application addresses an instance of the application backend via the predetermined fully qualified domain name.

The instance of the application backend addressed by the application frontend, i.e. the backend server providing the instance of the application backend, may preferably be located in an edge data center, as edge data centers allow for very small round trip times (RTT) and, hence, are particularly adequate for the application backend, i.e. for hosting and executing an instance of the application backend. Of course, different edge data centers may be connected to by different communication networks. First, a single country usually has a plurality of different communication networks. Second, different countries usually have different communication networks. Accordingly, the method supports edge data centers located in different countries, in particular different continents, and connected to by different communication networks. The method is not limited by a location of the edge data center or a communication network connected to the edge data center.

Due to the predetermined fully qualified domain name which as usually comprises at least two words separated by dots and is uniquely related to an IP address the application need not know the IP address of the instance of the application backend in advance which results in a flexibility of the communication network in dynamically assigning IP addresses to instances of application backends and, hence, allows for a scalability of the communication network with respect to the IP addresses used by distributed applications.

The fully qualified domain name may comprise names or indications of a provider of the distributed application, the communication network, the backend server, the distributed application and possibly further aspects of the instance of the application backend, e.g. a spatial location of the backend server providing the application backend. In other words, the comprised names or indications may be readily interpreted by a person or automatically extracted, e.g., by the core server of the communication network. Particularly, the indications of the distributed application may comprise a unique application ID of the distributed application.

During a normal operation, the distributed application transmits application data between the application frontend and the assigned application backend. It is noted that the transmission of the application data which necessarily depends on private IP addresses and/or public IP addresses enables the communication network, more precisely a selected quality service of the communication network, to identify the communication connection used by the distributed application and to apply the service quality to the identified communication connection. The service quality may comprise a maximum latency, i.e. a guaranteed latency, a minimum bitrate, i.e. a guaranteed bitrate (GBR), a slice, i.e. a predetermined subnet of the communication network guaranteeing a predetermined service quality, a combination thereof or the like.

The communication network may comprise one or more than one quality service, i.e. one or more than one network service configured for managing service qualities, e.g. respective qualities of service (QoS), of communication connections. Particularly, the communication network may comprise at least two quality services indeed different from each other, but still able to manage service qualities of the communication connections.

Of course, the fully qualified domain name has to be registered at the domain name server before the first normal operation phase of the distributed application, i.e. before the first lookup request of the application frontend. Accordingly, the fully qualified domain name may be registered by the domain name server at the time of building the application frontend or, at latest, immediately before launching the application frontend.

Both the IP address of the instance of the application backend and the corresponding resolving entry of the domain name server may be assigned and created, respectively, on demand and released and deleted, respectively, when the application backend is not addressed any longer by any application frontend. As a consequence, the method provides a dynamic flexibility in using IP addresses and enables an efficient use of IP addresses resulting in a high scalability of the communication network with respect to IP addresses used by distributed applications.

Preferably, predetermining the fully qualified domain name comprises storing the fully qualified domain name in the application frontend. Thus, the predetermined fully qualified domain name forms part of the application frontend and is readily used for addressing an instance of the application backend.

In some embodiments, storing the fully qualified domain name comprises configuring the application frontend when building the application frontend or updating the application frontend after building the application frontend. In the former case, the fully qualified domain name is applied to the building process of the application frontend as a building parameter. In the latter case, a configuration of the installed application frontend is updated with respect to the fully qualified domain name via a software update.

In alternative embodiments, storing the fully qualified domain name comprises pushing the fully qualified domain name into the application frontend via the communication network. Particularly, the fully qualified domain name may be pushed by a push service of the communication network.

In favorable embodiments, the fully qualified domain name is exclusively associated both with the backend server providing an instance of the application backend and with an application ID of the distributed application. In other words, there is one and only one instance of the application backend to be addressed via the fully qualified domain name. Of course, the one and only one instance of the application backend located at a particular IP address and associated with the fully qualified domain name may be connected to by a plurality of different application frontends simultaneously. Apart from that, more than one fully qualified domain name may be associated both with the backend server and with the application ID enabling the distributed application for providing more than one instance of the application backend on the backend server simultaneously.

Selecting the quality service advantageously comprises retrieving data related to the quality service from a quality booking database. The quality booking database comprises one or more than one quality service for applying the service quality to the communication connection used by the distributed application.

In advantageous embodiments, retrieving the data related to the quality service comprises transmitting a reverse lookup request based on the IP address of the transmitted application data to the domain name server, receiving the fully qualified domain name associated with the IP address from the domain name server, extracting an application ID of the distributed application and a name of a backend server executing the instance of the application backend from the received fully qualified domain name and comparing the extracted application ID and the extracted name of the backend server with a plurality of entries in the quality booking database, each entry comprising an application ID, a name of a backend server and data related to the service quality, and selecting an entry matching the extracted name of the backend server and the extracted application ID and retrieving the data related to the service quality of the selected entry as the data related to the quality service. The data related to the service quality comprises, for instance, configuration parameters for the quality service wherein the configuration parameters allow for causing the quality service to apply the service quality to the communication connection.

A core server of the communication network may configure the quality service depending on the data related thereto, the data indicating a type of the quality service and/or a configuration parameter for the quality service. The core server may particularly be configured to select a scheduler of the communication network as the quality service and apply the data to the selected scheduler.

Each entry in the quality booking database is preferably created in advance upon an application quality booking request. Ideally, the application provider providing the distributed application, in advance, books a service quality for the distributed application via the quality booking request before the distributed application is executed for the first time. However, the application provider, even after the first execution of the distributed application, may readily book or change the service quality for the distributed application.

In many embodiments, the connection is provided by a radio access network or a wired network as the communication network. Radio access networks (RAN), e.g. cellular networks or wireless local area networks (WLAN), are very common communication networks. The wired network may be configured as an Ethernet network or the like.

A second aspect of the invention is a core server for a communication network. As the communication network usually comprises a core server, the core server may be readily upgraded for supporting a method according to an exemplary embodiment.

According to the invention, the core server comprises a quality booking database and is configured for carrying out a method according to an exemplary embodiment together with a distributed application according to an exemplary embodiment (see below). The quality booking database allows for booking a service quality for a distributed application in advance.

A third aspect of the invention is a distributed application, comprising an application frontend to be executed by a terminal device and an application backend to be executed by a backend server remotely from the terminal device and to be connected to via a communication network. The distributed application may require a very high synchronicity. For instance, the distributed application may be an ADAS (Advanced Driver Assistance System), an AR (Augmented Reality)-application or an VR (Virtual Reality)-application configured for rendering remotely and streaming, respectively, or a Computer Vision Algorithm for industrial robots, vehicles or drones and the like.

According to the invention, the distributed application is configured for carrying out a method according to an exemplary embodiment together with a core server according to an exemplary embodiment. The distributed application is reliably operated with an adequate, i.e. sufficient, service quality and, hence, is executed in a very high synchronicity when carrying out a method according to an exemplary embodiment.

A fourth aspect of the invention is a system for operating a distributed application, comprising a communication network, a quality service, a domain name server and a distributed application. There are many such existing systems which may be readily upgraded for carrying out a method according to an exemplary embodiment.

According to the invention, the system comprises a server and a distributed application. The system scalably, universally, securely and reliably supports operating the distributed application or a large number of distributed applications requiring a very high synchronicity. It is an advantage of the method according to the invention that a scalable, universal, secure and reliable support is provided for distributed applications requiring a very high synchronicity. In other words, the method may be carried out by a system based on existing components of usual communication networks and is flexible with respect to assigning IP addresses to instances of application backends. Moreover, the method may be carried out using any communication network, i.e. application of the method does not depend on a particular communication network. Rather, the method still works with a plurality of different communication networks at the same time. Further, the method guarantees a unique identification of the distributed application and, thus, guarantees a high reliability in operating a distributed application with a sufficiently high synchronicity. Finally, the method allows for a sufficient scalability with respect to a number of distributed applications requiring a very low and stable latency.

Further advantages and configurations of the invention become apparent from the following description and the enclosed drawings.

It shall be understood that the features described previously and to be described subsequently may be used not only in the indicated combinations but also in different combinations or on their own without leaving the scope of the present invention.

The invention is described in detail via exemplary embodiments and with reference to the drawings. Like components are indicated by like reference numerals throughout the drawings.

FIG. 1 schematically shows an entity diagram of a system 1 according to the invention for operating a distributed application 10. The system 1 comprises a communication network 11, a quality service 112, a domain name server 13, a core server 110 according to the invention, the core server 110, the domain name server 13 and the quality service 112 usually being part of the communication network 11 and a distributed application 10 according to the invention.

The system 1 may further comprise a terminal device 14, i.e. an application client, for instance a smartphone, to be connected to the communication network 11 and a backend server, i.e. an application server, connected to the communication network 11, exemplarily located in an edge data center 15.

The core server 110 comprises a quality booking database 113 and is configured for carrying out a method as described below together with the distributed application 10.

The distributed application 10 comprises an application frontend 100 to be executed by the terminal device 14 and an application backend 101 to be executed by the backend server remotely from the terminal device 14 and to be connected to by the application frontend 100 via the communication network 11. The distributed application 10 is configured for carrying out the method as described below together with the core server 110.

The following method is carried out by the system 1 for operating the distributed application 10.

The application frontend 100 of the distributed application 10, upon a launch of the application frontend 100, transmits a lookup request 1002 based on a predetermined fully qualified domain name (FQDN) 130 associated with the application backend 101 of the distributed application 10 to the domain name server 13 via the communication network 11.

Predetermining the fully qualified domain name 130 may comprise storing the fully qualified domain name in the application frontend 100.

Storing the fully qualified domain name 130, in some embodiments, comprises configuring the application frontend 100 when building the application frontend 100, i.e. setting the fully qualified domain name as a building parameter, or updating the application frontend 100 after building the application frontend 100, e.g. updating a configuration of the installed application frontend via a software update.

In alternative embodiments, storing the fully qualified domain name 130 may comprise pushing the fully qualified domain name 130 into the application frontend 100 via the communication network 11. Particularly, the fully qualified domain name 130 may be pushed by a push service of the communication network 11.

The fully qualified domain name 130 may be exclusively associated both with the backend server providing an instance of the application backend 101 and with an application ID 102 of the distributed application 10.

The domain name server 13, upon receipt of the fully qualified domain name 130, transmits an IP address 1010 associated with the fully qualified domain name 130 to the application frontend 100.

The fully qualified domain name 130 may be registered by the domain name server 13 at the building time of the distributed application 10 or, at latest, immediately before launching of the application frontend 100.

Both the IP address 1010 of the instance of the application backend 101 and the corresponding resolving entry of the domain name server 13 may be assigned and created, respectively, on demand and released and deleted, respectively, when the application backend 101 is not addressed any longer by any application frontend 100.

The application frontend 100, upon receipt of the IP address 1010 transmits application data 1001 to the transmitted IP address 1010 via a connection 111 provided by the communication network 11. The connection 111 is exemplarily provided by a radio access network or by a wired network as the communication network 11.

The core server 110 of the communication network 11, upon transmission of the application data 1001, selects the quality service 112 of the communication network 11 for the distributed application 10. Selecting the quality service 112 may comprise retrieving data 1120 related to the quality service 112 from a quality booking database 113.

Retrieving the data 1120 related to the quality service 112 may comprise transmitting a reverse lookup request 1100 based on the IP address 1010 of the transmitted application data 1001 to the domain name server 13, receiving the fully qualified domain name 130 associated with the IP address 1010 from the domain name server 13, extracting an application ID 102 of the distributed application 10 and a name of the backend server executing the instance of the application backend 101 from the received fully qualified domain name 130 and comparing the extracted application ID 102 and the extracted name of the backend server with a plurality of entries 1130 in the quality booking database 113. Each entry 1130 comprises an application ID 102, a name of a backend server and data 1120 related to a service quality 1110. Retrieving the data 1120 may further comprise selecting an entry 1130 matching the extracted name of the backend server and the extracted application ID 102 and retrieving the data 1120 related to the service quality 1110 of the selected entry 1130 as the data 1120 related to the quality service 112.

The service quality 1110, i.e. the quality of service (QoS), may comprise a maximum latency, i.e. a guaranteed latency, a minimum bitrate, i.e. a guaranteed bitrate (GBR), a slice, i.e. a predetermined subnet of the communication network guaranteeing a predetermined service quality, a combination thereof or the like.

Advantageously, each entry 1130 in the quality booking database 113 is created in advance upon an application quality booking request 114, for instance by the application provider.

The core server 110 of the communication network 11 may configure the quality service 112 depending on the data 1120 related thereto, the data 1120 indicating a type of the quality service 112 and/or a configuration parameter for the quality service 112.

The communication network 11 applies a service quality 1110 determined by the selected quality service 112 to the connection 111.

The distributed application 10 is operated with the applied service quality 1110.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMERALS 1 system
10 distributed application
100 application frontend
1001 application data
1002 lookup request
101 application backend
1010 IP address
102 application ID
11 communication network
110 core server
1100 reverse lookup request
111 connection
1110 service quality
112 quality service
1120 data
113 quality booking database
1130 entry
114 quality booking request
115 data
13 domain name server
130 fully qualified domain name
14 terminal device
15 edge data center
150 data

The invention claimed is:

1. A method for operating a distributed application, comprising:
   transmitting, by a terminal device executing an application frontend of the distributed application, upon a launch of the application frontend, a lookup request based on a predetermined fully qualified domain name associated with an application backend of the distributed application to a domain name server via a communication network, wherein the application backend is executed on a backend server;
   transmitting, by the domain name server, upon receipt of the fully qualified domain name, an IP address associated with the fully qualified domain name to the application frontend executed on the terminal device;
   transmitting, by the terminal device executing the application frontend, upon receipt of the IP address, application data to the transmitted IP address via a connection provided by the communication network;
   selecting, by a core server of the communication network, upon transmission of the application data, a quality service for the distributed application; and
   applying, by the communication network, a service quality determined by the selected quality service to the connection for operation of the distributed application with the applied service quality.

2. The method according to claim 1, wherein predetermining the fully qualified domain name comprises storing the fully qualified domain name in the application frontend.

3. The method according to claim 2, wherein storing the fully qualified domain name comprises configuring the application frontend when building the application frontend or updating the application frontend after building the application frontend.

4. The method according to claim 2, wherein storing the fully qualified domain name comprises pushing the fully qualified domain name into the application frontend via the communication network.

5. The method according to claim 1, wherein the fully qualified domain name is exclusively associated both with the backend server providing an instance of the application backend and with an application ID of the distributed application.

6. The method according to claim 1, wherein selecting the quality service comprises retrieving data related to the quality service from a quality booking database.

7. The method according to claim 6, wherein retrieving the data related to the quality service comprises:
   transmitting a reverse lookup request based on the IP address of the transmitted application data to the domain name server;
   receiving the fully qualified domain name associated with the IP address from the domain name server;
   extracting an application ID of the distributed application and a name of a backend server executing the instance of the application backend from the received fully qualified domain name;
   comparing the extracted application ID and the extracted name of the backend server with a plurality of entries in the quality booking database, each entry comprising an application ID, a name of a backend server and data related to the service quality;
   selecting an entry matching the extracted name of the backend server and the extracted application ID; and
   retrieving the data related to the service quality of the selected entry as the data related to the quality service.

8. The method according to claim 6, wherein a core server of the communication network configures the quality service depending on the data related thereto, the data indicating a type of the quality service and/or a configuration parameter for the quality service.

9. The method according to claim 7, wherein each entry in the quality booking database is created in advance upon an application quality booking request.

10. The method according to claim 1, wherein the connection is provided by a radio access network or a wired network as the communication network.

11. A system for operating a distributed application, comprising:
- a terminal device configured to execute an application frontend of the distributed application;
- a backend server configured to execute an application backend of the distributed application;
- a domain name server; and
- a communication network comprising a core server;
- wherein the terminal device is configured to transmit, upon a launch of the application frontend, a lookup request based on a predetermined fully qualified domain name associated with the application backend to the domain name server via the communication network;
- wherein the domain name server is configured to transmit, upon receipt of the fully qualified domain name, an IP address associated with the fully qualified domain name to the application frontend;
- wherein the terminal device is configured to transmit, upon receipt of the IP address, application data to the transmitted IP address via a connection provided by the communication network;
- wherein the core server is configured to select, upon transmission of the application data, a quality service for the distributed application; and
- wherein the communication network is configured to apply a service quality determined by the selected quality service to the connection for operation of the distributed application with the applied service quality.

* * * * *